C. OEHRLEIN.
CULTIVATOR.
No. 176,240. Patented April 18, 1876.
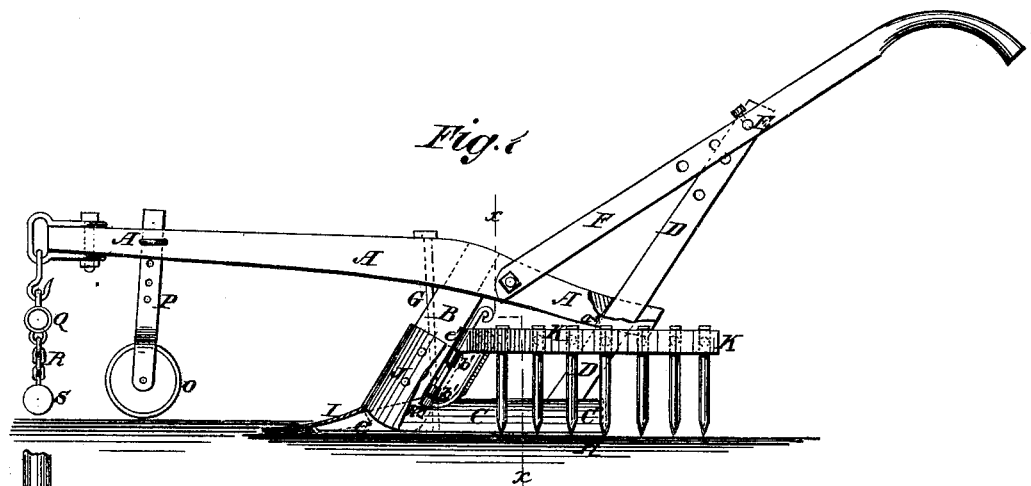
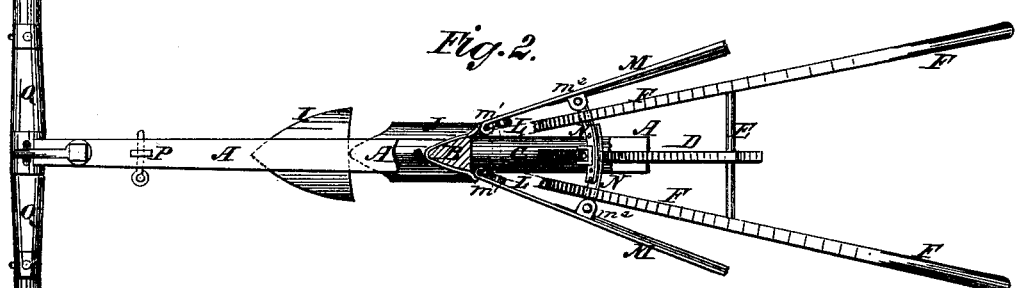
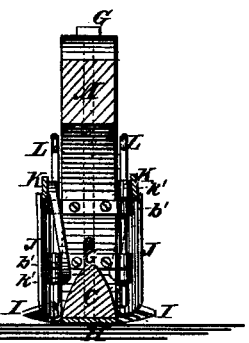
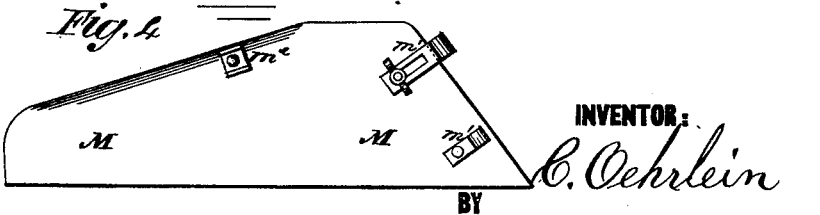
WITNESSES:
Francis McArdle
Alex F. Roberts
INVENTOR:
C. Oehrlein
BY
Munn & Co
ATTORNEYS.

UNITED STATES PATENT OFFICE.

CASPER OEHRLEIN, OF ST. PAUL, MINNESOTA.

IMPROVEMENT IN CULTIVATORS.

Specification forming part of Letters Patent No. 176,240, dated April 18, 1876; application filed November 19, 1875.

*To all whom it may concern:*

Be it known that I, CASPER OEHRLEIN, of St. Paul, in the county of Ramsey and State of Minnesota, have invented a new and useful Improvement in Potato Plow and Cultivator, of which the following is a specification:

Figure 1 is a side view of my improved implement arranged as a cultivator. Fig. 2 is a top view of the same arranged as a plow, and part of the beam and standard being broken away to show the construction. Fig. 3 is a cross-section of the same, taken through the line $x\ x$, Fig. 1. Fig. 4 is a detail view of the inner side of one of the plow-wings or mold-boards.

Similar letters of reference indicate corresponding parts.

The object of this invention is to furnish an improved implement for cultivating and plowing out or hilling potatoes and other plants growing in hills or rows, and which shall be simple in construction, conveniently adjusted for either use, and effective in operation.

The invention will first be described in connection with drawing, and then pointed out in claim.

A is the plow-beam, to which, toward its rear end, is attached the upper end of the standard B, which is made triangular in form, and to its lower end is attached the foot C. The rear end of the foot C is attached to the lower end of the upright D, which passes up through, and is secured to, the rear end of the beam A. The upright D projects above the beam A, and to its upper end is attached a round, E, to the ends of which are attached the handles F. The lower ends of the handles F are bolted and pivoted to the opposite sides of the beam A. Several holes are formed in the upright D and handles F, to receive the round E, so that, by moving the said round from one to another of said holes, the said handles may be adjusted according to the height of the plowman. The connection between the beam A, the upright B, and the foot C is strengthened against the draft-strain by a long brace-bolt, G, which passes through the said parts, as shown in Figs. 1 and 3. The lower side of the foot C is covered with a metal plate, H, to prevent wear. The forward end of the foot C projects in front of the standard B, is beveled off or pointed, and to it is bolted a triangular plow-point, I. To the standard B, just above the plow-plate, is secured an angular metallic plate, J.

As thus described, the implement is used for opening furrows to receive the seed.

K are the cultivator-rakes, the forward ends of the bars or heads of which have eyes $k^1$ formed upon them, to receive the bolts L, which also pass through eyes $b'$, attached to the standard B. The rakes K are used for cultivating potatoes and other plants while small, by loosening the soil, and tearing up and destroying the weeds. When the plants are to be hilled by having soil thrown around them, the rakes K are detached and replaced by the wings or mold-boards M, the upper edges of the rear parts of which are curved outward, as shown in Fig. 4, to throw the soil around the plants. To the forward ends of the wings or mold-boards M are attached eyes $m^1$, to receive the bolts L. The upper eyes $m^1$ are slotted, as shown in Fig. 4, so that the said wings or mold-boards M may be adjusted to throw the soil to a greater or less distance, as may be required. To the rear part of the rake-bars K, and of the mold-boards M, are attached eyes $k^2\ m^2$, respectively, to receive the outer ends of the bars N. The inner parts of the bars N overlap each other, and are slotted to receive the bolt by which they are secured to the upright D, so that the rear ends of the rakes K and the wings or mold-boards M may be adjusted wider apart or closer together, as may be required. O is the gage-wheel, the standard P of which passes up through the forward part of the beam A, has several holes formed through it, and is secured in place by a pin, so that it may be readily adjusted to cause the implement to work deeper or shallower in the ground. Q is the double-tree, which is connected with the forward end of the beam A by a hook and clevis or other suitable coupling. To the double-tree Q is connected, by short chains R, a bar, S, which is made of such a length as to reach across the adjacent rows of plants to knock off the potato-bugs, which are then covered by the soil and thus destroyed.

Having thus described my invention, I claim as new and desire to secure by Letters Patent—

The combination, with plow-beam A and standard B, of the shoe C, with flat sole and curved sides rising to an edge, and having a triangular point, I, curved plate J, and eyes $b'$, the whole adapted to use as a furrow-opener, or to receive a pair of extensible mold-boards, M, or rakes K, all constructed as herein shown and described.

CASPER OEHRLEIN.

Witnesses:
 J. W. TAYLOR,
 JB. MAINZER.